United States Patent Office 3,274,074
Patented Sept. 20, 1966

3,274,074
PREPARATION OF SALICYCLIC ACID BY MICROBIOLOGICAL OXIDATION OF NAPHTHALENE IN THE PRESENCE OF A BORON COMPOUND
James E. Zajic and William J. Dunlap, Oklahoma City, Okla., assignors to Kerr-McGee Oil Industries, Inc., a corporation of Delaware
No Drawing. Filed Oct. 24, 1963, Ser. No. 318,508
15 Claims. (Cl. 195—51)

This invention relates to the preparation of salicylic acid and more particularly to an improved process for preparing salicylic acid by microbiological oxidation of naphthalene.

Salicylic acid is a valuable substance of commerce. It is used extensively in the manufacture of methylsalicylate, acetylsalicylic acid and certain dyes. It also serves as an excellent preservative for food products and is useful for medicinal purposes as a bacteriostat or in the form of acetylsalicylic acid as an analgesic and an antirheumatic agent.

The production of salicylic acid from naphthalene by microbiological oxidation has attracted much interest in the industry due to the relative differences in value of the end product salicylic acid and the inexpensive and plentiful starting material naphthalene. While certain species of the genus Pseudomonas have been observed to oxidize naphthalene to salicylic acid, the yield of salicylic acid obtained heretofore has been unsatisfactory. There also is much variability in yield and the relative proportion of various intermediates vary widely. In many cultures the accumulation of salicylic acid in the fermentation medium is accompanied by a decrease in the viable cell population and after a resultant lag phase, there is renewed growth of the bacterial population and a concomitant decrease in the yield of salicylic acid. In view of these problems of the prior art, the development of a dependable process permitting the accumulation of salicylic acid in fermentation media during oxidative fermentation of naphthalene has been the subject of much study. Nevertheless most of the salicylic acid of commerce is produced at present from phenol by modifications of the Kolbe synthesis despite the numerous attempts over the years to produce salicylic acid in large amounts by biological oxidation of naphthalene.

It is an object of the present invention to provide an improved process for preparing salicylic acid by microbiological oxidation of naphthalene.

It is a further object to provide an improved process for accumulating salicylic acid during the oxidative fermentation of naphthalene.

It is still a further object to increase the yield of salicylic acid produced by microbiological oxidation of naphthalene.

Still other objects and advantages of the invention will be apparent to those skilled in the art from the following detailed description and the specific examples.

It has been discovered that an increased yield of salicylic acid may be recovered in the oxidative fermentation of naphthalene by incorporating a small amount of a boron compound with an aqueous nutrient medium employed in naphthalene fermentation. Thus, in accordance with one important aspect of the present invention the microbiological oxidation of naphthalene is carried out in a fermentation medium containing an added boron compound.

An increased yield of salicylic acid may be obtained by incorporating small quantities of inorganic boron compounds, organic boron compounds or mixtures of inorganic and organic boron compounds with aqueous media normally employed in naphthalene fermentation. It has been found that the presence in fermentation media of small quantities such as for example 0.1–1% by weight and preferably 0.2–0.6% by weight, of manganese borate, boron nitride, molybdenum boride, molybdenum diboride, sodium borate perhydrate, sodium perborate tetrahydrate, boron carbide, bismuth borate, lithium metaborate, triethyl borate, tri-n-butyl borate, and boron complexes of isooctylchlorosaligenin and isononylchlorosaligenin are effective to increase the yield of solicylic acid. Of these compounds, usually the boron complex of isononylchlorosaligenin is the most effective and is preferred, although molybdenum boride also gives excellent results. The beneficial effect of the boron compound on the yield of salicylic acid is general and it is not limited to any given species of microbes of the genus Pseudomonas used in the microbiological oxidation.

The microorganisms which may be employed in practicing the invention are species of Pseudomonas, and examples of species which are especially useful are *P. aeruginosa, P. oleovorans, P. stutzeri, P. rathonis* and *P. desmolyticum. Pseudomonas rathonis* and *Pseudomonas olevorans* are usually preferred over other species of Pseudomonas.

A variety of inorganic compounds are known to be utilized by species of microorganisms of the genus Pseudomonas employed in practicing the present invention. It is understood that an aqueous nutrient medium or basal fermentation medium normally used in cultivating a specific species of microorganisms may be used in practicing the invention upon adding a boron compound described herein in an effective amount.

When employing species of Pseudomonas, the aqueous basal fermentation medium may contain the usual mineral salts which are normally used in the cultivation of these microbes. One aqueous basal fermentation medium which is very useful contains by weight based upon the weight of the fermentation medium, 0.2% sodium nitrate, 0.02% magnesium sulfate, 0.1% iron sulfate, 0.021% dibasic potassium phosphate, 0.009% monobasic potassium phosphate, 0.004% sodium chloride, 0.0015% calcium chloride, 0.5 microgram/100 ml. copper sulfate, 1.0 microgram/100 ml. boric acid, 1.0 microgram/100 ml. manganous sulfate, 7.0 micrograms/100 ml. zinc sulfate and 1.0 microgram/100 ml. molybdic acid. The pH of the nutrient medium may be adjusted to 7.4 by addition of base and the medium is sterilized in an autoclave at 15 pounds pressure at a temperature of about 121° C. for thirty minutes. If desired, the nutrient medium may contain up to 1.5% by weight of mono and dibasic potassium phosphate and the high buffering capacity of the phosphate tends to neutralize the salicylic acid as it is formed and increase the apparent solubility of naphthalene. When high yields of salicylic acid are observed, it is often desirable to add 0.005–0.1% by weight of calcium carbonate. Nontoxic emulsifying agents such as 0.001–0.1% by weight of alkyl phenol or nonionic octylphenoxyethanol surfactants may be added to give stabilized emulsions and improve the apparent solubility of naphthalene. If it is desired to cultivate species of Pseudomonas on solid media, then about 2% by weight of agar may be added to the basal mineral salts fermentation medium.

The highly toxic nature of naphtalene to most microbes generally makes sterilization unnecessary prior to inoculation of the basal fermentation medium with the desired microbes. However, if desired the naphthalene may be sterilized with the fermentation medium or added separately after sterilization of the fermentation medium. A nutrient medium such as described above may be provided with 0.5–4% by weight and preferably 1–1.5% by weight of naphthalene as a substrate, and 0.1–1% and preferably 0.2–0.6% by weight of an added boron compound. Preferably, the naphthalene is in a finely divided condition and for best results the boron compound also is in a finely divided condition when insoluble in the aqueous nutrient medium. The nutrient medium may be inoculated with a suitable amount of an inoculum, such as with a liquid inoculum in an amount of 0.2–10% and preferably about 3% by volume of the nutrient medium. The nutrient medium may be incubated at a temperature at which the microbes will grow and multiply rapidly such as 25–50° C. and preferably 30–35° C. For best results, the nutrient medium is agitated during the incubation period. The incubation may extend over any suitable period of time to biologically oxidize the naphthalene to salicylic acid such as 2–7 days and preferably 4–6 days, but the incubation period may vary considerably depending somewhat on how rapidly the microbes multiply under the incubation conditions employed in a specific instance. When the incubation period has expired, the salicylic acid product may be recovered from the aqueous nutrient medium.

The fermentation step may be conducted in experimental laboratory equipment or large scale fermentors such as 100, 1,000 or 20,000 gallon fermentors. The chemical and physical conditions used in the larger fermentors may be related directly to those used in the experimental type vessels and in general no difficulty is encountered upon increasing the size of the fermentator.

In carrying out the fermentation on a laboratory scale, 100 ml. of fermentation medium as described above may be added to a 500 ml. Erlenmeyer flask and the contents inoculated with a suitable amount of liquid inoculum. Standard cotton tops and handling procedures may be utilized. Suitable amounts of the naphthalene and the boron compound may be added and the contents of the flask may be incubated with agitation and aeration.

It is understood that during the incubation period the fermentation medium should be maintained under conditions which are optimum for the multiplication and growth of the microbes. Factors which affect the multiplication and growth of microbes include temperatures, agitation, aeration and the initial pH of the nutrient medium. The temperature of incubators which may be employed is preferably 25–50° C. and for best results 30–35° C. Shakers and other suitable apparatus may be utilized to provide agitation and aeration. It is also preferred that the initial pH of the nutrient media be 4–9 and preferably about 7.

The salicylic acid may be recovered from the fermentation medium after expiration of the incubation period by any of several known methods. For example, the fermentation reaction mixture may be acidified to a pH of about 3 and extracted with an organic solvent which is immiscible with water. Suitable solvents for the extraction include esters of lower fatty acids such as ethyl or butyl acetate, esters, polychloroalkanes such as dichloromethane, and chloroform. The polychloroalkanes are especially suitable as they selectively extract salicylic acid from aqueous solutions containing gentisic acid which is often present in the fermentation medium. The crude salicylic acid obtained by the extraction step may be recovered from the organic extractant by evaporation and crystallization from the solvent, and if desired may be further purified by sublimation or other suitable processes.

The foregoing detailed description and the following specific examples are for purposes of illustration only, and are not intended as being limiting to the spirit or scope of the appended claims.

*Example I*

This example illustrates the effect of boron compounds on the accumulation of salicylic acid in fermentation media. Manganese borate, boron nitride, molybdenum boride, molybdenum diboride, sodium borate perhydrate, sodium perborate tetrahydrate, boron carbide, bismuth borate, and lithium metaborate were added to culture media containing 1% by weight of finely divided naphthalene in concentrations of 0, 0.2, 0.4, 0.6 and 0.8 percent by weight. The culture media were inoculated with *Pseudomonas rathonis*, incubated in flasks for six days at 30° C. on a rotary shaker revolving at 130 r.p.m. and assayed for salicylic acid. The data thus obtained are recorded below in Table I.

TABLE I

| Boron Compound | Milligrams Salicylic Acid per 100 ml. of Fermentation Media Containing the Stated Percent of Boron Compound | | | | |
|---|---|---|---|---|---|
| | 0.0% | 0.2% | 0.4% | 0.6% | 0.8% |
| Manganese Borate | 0.3 | 11.8 | 3.4 | | |
| Boron Nitride | 0.3 | 14.5 | 29.7 | 43.0 | 29.1 |
| Molybdenum Boride | 0.3 | 61.6 | 28.8 | 17.2 | 15.6 |
| Molybdenum Diboride | 0.3 | 34.0 | 22.8 | 8.8 | 2.0 |
| Sodium Borate Perhydrate | 0.3 | 5.0 | 45.0 | 25.2 | 24.0 |
| Sodium Perborate Tetrahydrate | 0.3 | | 37.4 | 27.0 | 21.6 |
| Boron Carbide | 0.3 | 2.0 | 42.0 | | |
| Bismuth Borate | 0.3 | | | 8.8 | 4.0 |
| Lithium Metaborate | 0.3 | 20.0 | 9.6 | 1.6 | |

*Example II*

The effect on salicylic acid production of some commercially available organic compounds and complexes containing boron is illustrated in this example. Triethyl borate, tri-n-butyl borate and boron complexes of isooctylchlorosaligenin and isononylchlorosaligenin were added to culture media containing 1% by weight of naphthalene at concentrations of 0.0, 0.2, 0.4, 0.6 and 0.8 percent by weight. Flasks were inoculated with *Pseudomonas rathonis* and were incubated and assayed for salicylic acid as in Example I. The data thus obtained are recorded below in Table II.

TABLE II

| Organic Boron Compound or Complex | Milligrams Salicylic Acid per 100 ml. of Fermentation Media Containing the Stated Percent of Boron Compound or Complex | | | | |
|---|---|---|---|---|---|
| | 0.0% | 0.2% | 0.4% | 0.6% | 0.8% |
| Triethyl Borate | 0.3 | 1.0 | 22.0 | 27.6 | 34.2 |
| Tri-n-Butyl Borate | 0.3 | 34.6 | 17.0 | 18.2 | 26.2 |
| Boron Isooctylchlorosaligenin | 0.3 | 6.0 | 6.0 | 46.0 | 37.6 |
| Boron Isononylchlorosaligenin | 0.3 | 88.0 | 96.0 | 100.0 | 102.0 |

Example III

This example illustrates that organic and inorganic boron-containing compounds and complexes are effective in increasing the yield of salicylic acid obtained from the fermentation of naphthalene. Cultures of *Pseudomonas oleovorans*, *Pseudomonas stutzeri*, and *Pseudomonas rathonis* were used to inoculate fermentation flasks containing basal fermentation media, 1% by weight of finely divided naphthalene and either 0.4% boron nitride, 0.2% molybdenum boride, 0.4% sodium borate perhydrate, 0.4% tri-n-butyl borate, or 0.4% boron isononylchlorosaligenin. Flasks were incubated for six days and the fermentation broth analyzed for salicylic acid as in Example I. The data thus obtained are recorded in Table III.

TABLE III

| Percent Boron Compound (or Complex) | Salicylic Acid: mg. per 100 ml. of Fermentation Broth upon Inoculation with— | | |
|---|---|---|---|
| | *Pseudomonas oleovorans* | *Pseudomonas stutzeri* | *Pseudomonas rathonis* |
| Controls | 0 | 0 | 0 |
| 0.4% Boron Nitride | 3.6 | 0 | 21.4 |
| 0.2% Molybdenum boride | | | 52.4 |
| 0.4% Sodium borate perhydrate | 1.6 | 3.6 | 50.4 |
| 0.4% Tri-n-butyl borate | 28.6 | 2.26 | 17.0 |
| 0.4% Boron isononylchlorosaligenin | 72.0 | 8.0 | 96.0 |

What is claimed is:

1. A process for preparing salicylic acid comprising cultivating a microorganism capable of oxidizing naphthalene to salicylic acid to the genus Pseudomonas in an aqueous nutrient medium containing naphthalene and an added boron compound to thereby microbiologically oxidize the naphthalene to salicylic acid.

2. A process for preparing salicylic acid comprising cultivating *Pseudomonas rathonis* in an aqueous nutrient medium containing naphthalene and an added boron compound to thereby microbiologically oxidize the naphthalene to salicylic acid.

3. A process for preparing salicylic acid comprising cultivating *Pseudomonas oleovorans* in an aqueous nutrient medium containing naphthalene and an added boron compound to thereby microbiologically oxidize the naphthalene to salicylic acid.

4. A process for preparing salicylic acid comprising cultivating a microorganism capable of oxidizing naphthalene to salicylic acid of the genus Pseudomonas in an aqueous nutrient medium containing naphthalene and an added boron compound to thereby microbiologically oxidize the naphthalene to salicylic acid, the boron compound being selected from the group consisting of manganese, borate, boron nitride, molybdenum boride, molybdenum diboride, sodium borate perhydrate, sodium perborate tetrahydrate, boron carbide, bismuth borate, lithium metaborate, triethyl borate, tri-n-butyl borate and boron complexes of isooctylchlorosaligenin and isononylchlorosaligenin.

5. A process for preparing salicylic acid comprising cultivating a microorganism capable of oxidizing naphthalene to salicylic acid for the genus Pseudomonas in an aqueous nutrient medium containing naphthalene and about 0.1–1% by weight of an added boron compound to thereby microbiologically oxidize the naphthalene to salicylic acid.

6. A process for preparing salicylic acid comprising cultivating a microorganism capable of oxidizing naphthalene to salicylic acid of the genus Pseudomonas in an aqueous nutrient medium containing naphthalene and about 0.1–1% by weight of a boron compound to thereby microbiologically oxidize the naphthalene ot salicylic acid, the boron compound being selected from the group consisting of manganese borate, boron nitride, molybdenum diboride, sodium borate perhydrate, sodium perborate, tetrahydrate, boron carbide, bismuth borate, lithium metaborate, triethyl borate, tri-n-butyl borate and boron complexes of isooctylchlorosaligenin and isononylchlorosaligenin.

7. A process for preparing salicylic acid comprising cultivating a microorganism capable of oxidizing naphthalene to salicylic acid of the genus Pseudomonas in an aqueous nutrient medium containing about 0.5–4% by weight of naphthalene and about 0.1–1% by weight of an added boron compound to thereby microbiologically oxidize the naphthalene to salicylic acid.

8. The process of claim 7 wherein the naphthalene is present in an amount of about 1.0–1.5% by weight.

9. The process of claim 7 wherein the boron compound is the boron complex of isononylchlorosaligenin.

10. The process of claim 7 wherein the aqueous nutrient medium is maintained at a temperature of about 25–50° C.

11. A process for preparing salicylic acid comprising the steps of forming an aqueous nutrient medium for microorganisms capable of oxidizing naphthalene to salicylic acid of the genus Pseudomonas containing basal mineral salts, 0.5–4% by weight of finely divided naphthalene and 0.1–1% by weight of a boron compound, inoculating the nutrient medium with an inoculum containing a microorganism capable of oxidizing naphthalene to salicylic acid of the genus Pseudomonas, the inoculated nutrient medium having an initial pH value of about 4–9, incubating the inoculated nutrient medium at a temperature of about 25–50° C. for a period of about 2–7 days and then recovering salicylic acid from the nutrient medium.

12. The process of claim 11 wherein the nutrient medium is inoculated with about 0.2–10% by volume of a liquid inoculum containing a microorganism of the genus Pseudomonas and the inoculated nutrient medium is agitated during the incubation step.

13. The process of claim 11 wherein the boron compound is the boron complex of isononylchlorosaligenin.

14. The process of claim 13 wherein the nutrient medium is incubated at a temperature of about 30–35° C. for a period of about 4–6 days.

15. The process of claim 14 wherein the inoculated nutrient medium has an initial pH value of about 7.

References Cited by the Examiner

UNITED STATES PATENTS 3,183,169   5/1965   Brillaud _____ 195—28

OTHER REFERENCES

Klausmeier et al., Journal of Bacteriology, vol. 73, January–June 1957, pp. 461–464.

A. LOUIS MONACELL, *Primary Examiner.*

D. M. STEPHENS, *Assistant Examiner.*

UNITED STATES PATENT OFFICE
CERTIFICATE OF CORRECTION

Patent No. 3,274,074 September 20, 1966

James E. Zajic et al.

It is hereby certified that error appears in the above numbered patent requiring correction and that the said Letters Patent should read as corrected below.

Columns 5 and 6, TABLE III, under the heading Pseudomonas stutzeri, line 5 thereof, for "2.26" read -- 22.6 --.

Signed and sealed this 22nd day of August 1967.

(SEAL)
Attest:

ERNEST W. SWIDER
Attesting Officer

EDWARD J. BRENNER
Commissioner of Patents